(12) United States Patent
Wu et al.

(10) Patent No.: US 9,307,230 B2
(45) Date of Patent: Apr. 5, 2016

(54) LINE PAIR BASED FULL FIELD SHARPNESS TEST

(71) Applicant: Apple Inc., Cupertino, CA (US)

(72) Inventors: Fei Wu, Sunnyvale, CA (US); Mark N. Gamadia, Longmont, CO (US); Shizhe Shen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 468 days.

(21) Appl. No.: 13/630,359

(22) Filed: Sep. 28, 2012

(65) Prior Publication Data

US 2014/0002673 A1   Jan. 2, 2014

Related U.S. Application Data (60) Provisional application No. 61/666,630, filed on Jun. 29, 2012.

(51) Int. Cl.
*G06K 9/00* (2006.01)
*H04N 17/00* (2006.01)

(52) U.S. Cl.
CPC ................................ *H04N 17/002* (2013.01)

(58) Field of Classification Search
CPC . H04N 17/002; H04N 1/00002; H04N 5/232; H04N 5/23229; H04N 17/04; H04N 1/00018; H04N 1/00031; H04N 1/00045; H04N 1/00053; H04N 1/00063; H04N 2101/00; H04N 9/3191; G01M 11/0264; G01M 11/02; G06K 9/036; G06K 9/46; G06K 9/4652; G06K 9/6203
See application file for complete search history.

(56) References Cited

U.S. PATENT DOCUMENTS

| | | | |
|---|---|---|---|
| 6,476,394 B1 * | 11/2002 | Amitani et al. | 250/368 |
| 8,090,218 B2 | 1/2012 | Larkin et al. | |
| 8,194,136 B1 | 6/2012 | Askey et al. | |
| 2005/0094133 A1 | 5/2005 | Ouellette | |
| 2005/0275724 A1 | 12/2005 | Albertelli | |
| 2007/0076981 A1 | 4/2007 | Ojanen | |

(Continued)

FOREIGN PATENT DOCUMENTS

| | | |
|---|---|---|
| AU | 2007254622 A1 | 7/2009 |
| CN | 1635801 A | 7/2005 |

(Continued)

OTHER PUBLICATIONS

Singapore Written Opinion (Dated Jun. 27, 2014), Application No. 201305091-9, Application Filing Date—Jun. 28, 2013, 12 pages.

(Continued)

*Primary Examiner* — Tom Y Lu
(74) *Attorney, Agent, or Firm* — Blakely, Sokoloff, Taylor & Zafman LLP (57) ABSTRACT

Optical characteristics of an optical component for a high volume manufacture consumer electronics device can be tested using a test chart composed of a superposition of two or more groups of parallel line pairs, wherein all the groups of parallel line pairs are oriented at a different inclination. The groups of line pairs could be oriented so that they are perpendicular to each other. A test system can quickly and objectively assess for example the sharpness of the optical component in different directions across a full image field of view of an imaging system that is capturing a digital image of the chart using the optical component for through-the-lens imaging. Other embodiments are also described and claimed.

20 Claims, 7 Drawing Sheets

(56) References Cited

U.S. PATENT DOCUMENTS

| | | |
|---|---|---|
| 2010/0157047 A1 | 6/2010 | Larkin et al. |
| 2011/0169977 A1 | 7/2011 | Masuda |
| 2012/0013760 A1 | 1/2012 | Parodi-Keravec et al. |
| 2013/0083205 A1 | 4/2013 | Gamadia et al. |

FOREIGN PATENT DOCUMENTS

| | | |
|---|---|---|
| CN | 1770882 A | 5/2006 |
| CN | 101489040 A | 7/2009 |
| CN | 101676805 A | 3/2010 |
| CN | 101751672 A | 6/2010 |
| JP | 2000097639 A | 4/2000 |
| KR | 1020070121216 A | 12/2007 |
| WO | WO-2005096218 A1 | 10/2005 |
| WO | WO-2012044300 A1 | 4/2012 |

OTHER PUBLICATIONS

Singapore Search Report (Date of Mailing Jul. 11, 2014), Application No. 201305091-9, Application Filing Date—Jun. 11, 2013, 7 pages.

"Line Pair", Wikipedia, Jun. 28, 2012, Internet at: http://en.wikipedia.org/wiki/Line_pair, (1 page).

Hsu, Wei-Feng, "Measurement of the Spatial Frequency Response (SFR) of Digital Still-Picture Cameras Using a Modified Slanted Edge Method", Institute of Electro-Optical Engineering, Tatung University, Proceedings of SPIE vol. 4080 (2000), (pp. 96-103).

CN 1st Office Action (dated Jan. 13, 2015), Application No. 201310435062.0, Date Filed—Jun. 28, 2013, (20 pages).

CN Search Report (dated Jan. 13, 2015), Application No. 201310435062.0, Date Filed—Jun. 28, 2013, (2 pages).

Guiling, Li, et al., "HDTV Image Definition Composite Test Pattern", Advanced Display Supplement, published on Sep. 1, 2013, (pp. 63-65).

Wang, Xin, et al., "Algorithm of Image Definition Evaluation Based on Lifting Wavelet Transform", Journal of Northeast Normal University (Nature Science Edition), vol. 41, No. 4, published on Dec. 31, 2009, (pp. 52-57).

Singapore Search and Examination Report (dated Feb. 9, 2015), Application No. 2013050919, Application Filing Date—Jun. 28, 2013, (12 pages).

\* cited by examiner

Superposition and Range Adjustment:

$$T'_{tan}(x,y) = 255\left[\frac{T_{tan}(x,y)-\min(T_{tan}(x,y))}{\max(T_{tan}(x,y))-\min(T_{tan}(x,y))}\right]$$

$$T'_{sag}(x,y) = 255\left[\frac{T_{sag}(x,y)-\min(T_{sag}(x,y))}{\max(T_{sag}(x,y))-\min(T_{sag}(x,y))}\right]$$

$$T_c(x,y) = T'_{tan}(x,y) + T'_{sag}(x,y)$$

$$T'_c(x,y) = 255\left[\frac{T_c(x,y)-\min(T_c(x,y))}{\max(T_c(x,y))-\min(T_c(x,y))}\right]$$

Thresholding:

$$T''_c(x,y) = \begin{cases} L_W & T'_c(x,y) \geq 0.5(\max(T'_c(x,y))-\min(T'_c(x,y))) \\ L_B & \text{otherwise} \end{cases}$$

Line-Pair Frequency:

$$f_1 = \gamma f_{Nyquist}$$

Line-Pair Orientation:

$$\theta_{tan} = \arctan\left(\frac{\beta}{\alpha}\right)$$

$$\theta_{sag} = \theta_{tan} + \frac{\pi}{2}$$

Tangential & Sagittal Frequencies:

$$f_{x,tan} = f_1 \cos(\theta_{tan}) \quad f_{x,sag} = f_1 \cos(\theta_{sag})$$

$$f_{y,tan} = f_1 \sin(\theta_{tan}) \quad f_{y,sag} = f_1 \sin(\theta_{sag})$$

Tangential & Sagittal Sinusoids:

$$T_{tan}(x,y) = \cos(2\pi f_{x,tan} x + 2\pi f_{y,tan} y)$$

$$T_{sag}(x,y) = \cos(2\pi f_{x,sag} x + 2\pi f_{y,sag} y)$$

FIG. 7

LINE PAIR BASED FULL FIELD SHARPNESS TEST

RELATED MATTERS

This application claims the benefit of the earlier filing date of provisional application No. 61/666,630, filed Jun. 29, 2012.

Embodiments of the invention relate to testing the performance of an optical component through the measurement of image quality in a digital imaging system that contains the optical component. More particularly, an embodiment of the invention relates to assessing the sharpness performance across the entire field of view. Other embodiments are also described.

BACKGROUND

Digital imaging systems (e.g., cameras) have quickly become a standard feature for portable devices including portable multimedia players, smart phones, and tablet computers. The image quality expected from these portable cameras has grown as higher quality and higher megapixel cameras have been incorporated into such small devices. As portable device dimensions shrink, so do the dimensions of the incorporated camera modules. At such small scales, mass produced camera modules become more susceptible to image quality degradation due to slight deviations or variations in the optical components introduced during manufacture or imaging system assembly. Sharpness degradation is an example of such detrimental degradation that could arise in such cases.

Several quality analysis metrics may be used to describe different aspects of image quality in a captured, digital image, to identify detrimental degradations during manufacturing test. For one, test systems may measure the sharpness of an image produced by an imaging system. The sharpness may vary in different parts of the captured image, where typically the center of the digital image may be sharper than its corner. Still further, test systems may monitor spatial sharpness in different directions (e.g., meridional, sagittal, horizontal, vertical). Such tests use the concept of a slanted edge based spatial frequency response (SFR) where an SFR curve is computed for edges captured in a digital image. Computation costs for SFR-based testing increases for increased image field coverage, which makes full field SFR tests impractical for fast, mass production quality testing.

SUMMARY

It has been determined that a measurement setup is needed that yields optical performance or quality analysis metrics quickly and conveniently, in order to maintain a low cost for performing the measurements, particularly for very high volume manufacturing of smaller camera modules, for example those used in consumer electronic devices such as smart phones, tablet computers, desktop computers, and in-room and in-vehicle entertainment systems.

Sharpness performance of an optical component is assessed within an imaging system, by aiming the imaging system at a test chart having a superposition of two or more groups of parallel line pairs, wherein all of the groups of parallel line pairs have the same spatial frequency and are oriented at different inclinations. All of the line pairs may extend uninterrupted from one edge to another edge of the field of view of an imaging system, to enable a full field evaluation. Line pairs with multiple different spatial frequencies can be implemented in the same manner.

The chart can be imaged using a device under test, DUT (e.g., an optical component such as a lens module, a camera module, or a device in which the entire imaging system is integrated), and is designed so that under the proper focus, zoom and distance to target conditions, the groups of parallel line pairs fill the full image field of view (and hence the entire area of a digital image that is captured by the image sensor or imager). The imager may be integrated as part of the DUT (e.g., as part of a camera module under test). A test system or test process may then objectively assess the optical characteristics of the DUT in terms of the DUTs ability to maintain a certain level of image quality (e.g., sharpness) in different directions throughout the entire spatial extent of the imager's image field. An advantage here is that the sharpness in different directions throughout the entire spatial extent of a captured digital image can be captured with one shot of imaging and calculated quickly using a computationally simple process, because in effect, the test chart (and hence its digital image) contains greater complexity.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

A test system or process may be used to objectively test or assess the performance of an optical system in terms of its ability to maintain a certain level of image quality (e.g., sharpness) throughout the spatial extent of the captured image. Thus, the performance of an optical system may be tested through the measurement of image quality in a digital imaging system that contains the optical system. This document discloses embodiments of test charts, systems and processes to quickly perform examination of an optical system's full field sharpness (the sharpness across the entire spatial area possible for a captured image or frame of the imaging system) in multiple directions. The test system or process uses an image of a test chart or target to assess full field sharpness performance of an imaging system component, which is the device under test, DUT (e.g., optical lens assembly, entire camera module including front end camera image signal processing).

Chart

Figure 1:
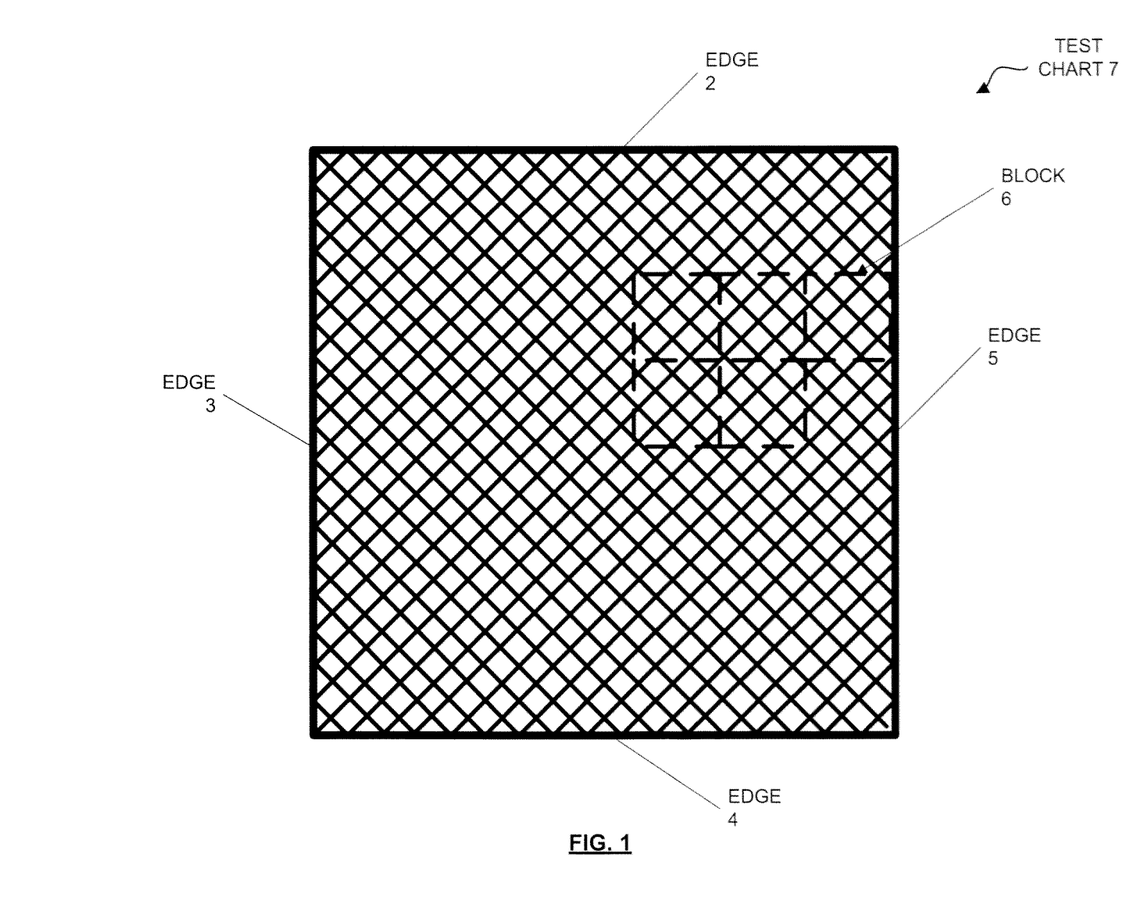
FIG. 1 is a representation of a test chart that can be used for the measurement of optical performance or optical characteristics, using images captured by an imaging system, in accordance with embodiments of this invention.
Figure 2:
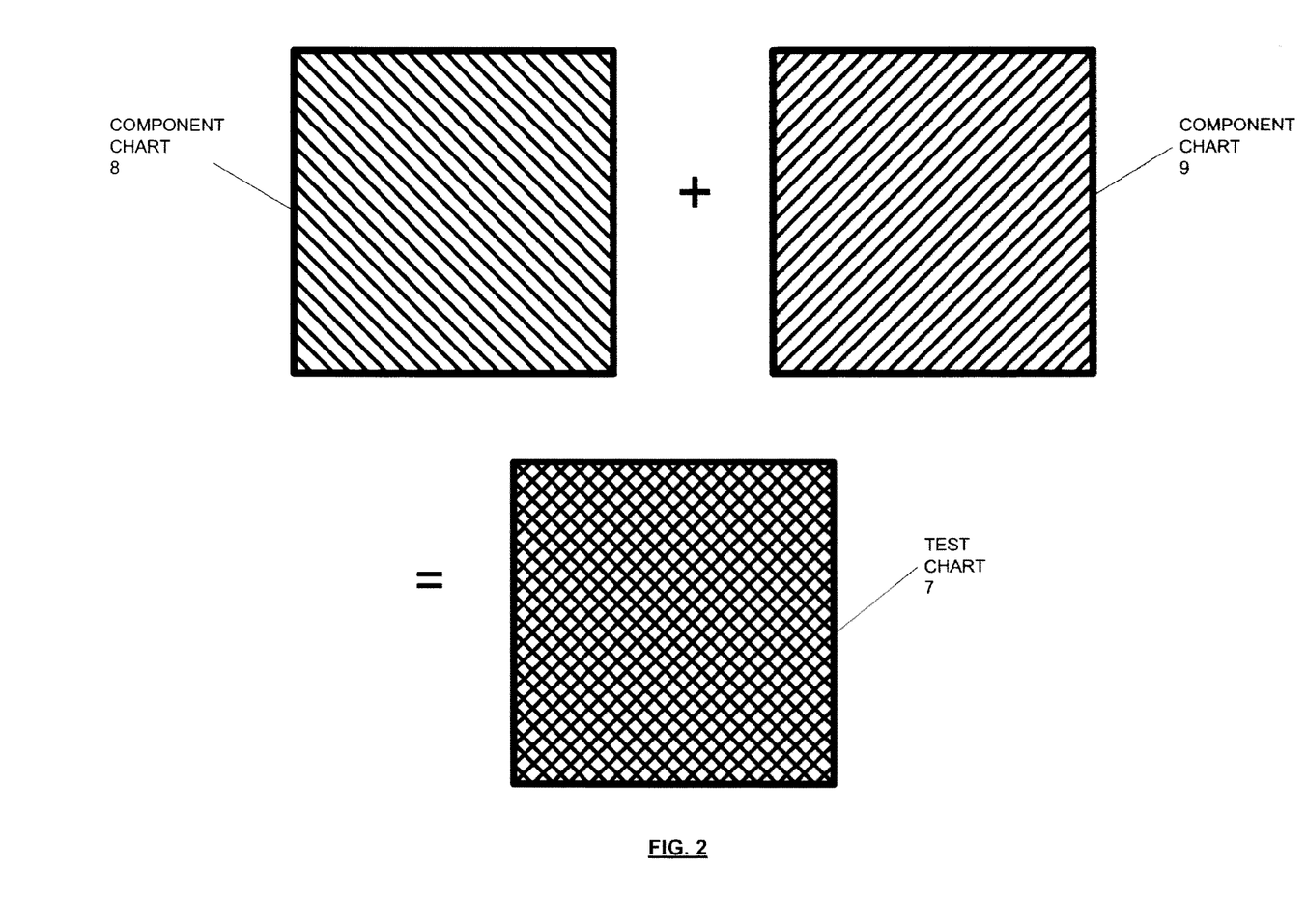
FIG. 2 is a diagram of how the test chart depicted in FIG. 1 can be created by a superposition of two or more component charts.

FIG. 1 is a representation of a test chart 7 that can be used (e.g., as an image target) for the monitoring and measurement of image quality of an image captured by a digital camera or imaging system, in accordance with embodiments of the invention. In some cases, test chart 7 may be referred to as a "test chart". Test chart 7 may be used for the objective assessment of the full field sharpness performance of any optical component of a given imaging system. FIG. 2 is a representation of how the Test Chart 7 can be formed by a superposition of multiple charts. Component chart 8 contains bi-tonal parallel line pairs that run diagonally across the full field of the chart, each line pair extending uninterrupted from one edge to another as shown. Component chart 9 contains bi-tonal parallel line pairs that run anti-diagonally across the full field of the chart. Test chart Z is a superposition of component chart 8 and component chart 9. The test chart 7 may be viewed as a superposition of only two component charts, but it may be alternatively composed of a superposition of more than two component charts.

The size of the test chart along with the spatial frequency of the line pairs (e.g., the period or frequency of adjacent lines of the chart) can be selected to match with the imaging system considering the system-to-chart distance (e.g., related to the period of the lines as imaged by the imaging system), image sensor pixel pitch, as well as the peak contrast sensitivity of the human visual system. When imaged by a system under test, the test chart provides sufficient amount of spatial detail in different directions, which can be effectively used by a digital image processor to precisely detect image quality defects in components of a given imaging system. The period of the line pairs (e.g., distance from leading edge of one line to leading edge of the adjacent line having similar direction) in each direction is derived from a specific spatial frequency of interest, which is usually related to (or selected to be equal to) the pixel pitch of an image sensor component of the imaging system (e.g., period of adjacent lines is selected to be $Fn/4$ or $Fn/2$, where $Fn$ is the Nyquist spatial frequency of the imaging system). Note that the spacing (or spatial frequency) of line pairs as they are drawn in the figures here is very large for illustration purposes. In practice, the spacing will be much finer or narrower.

Multiple spatial frequencies can be implemented using different test charts (each with a unique and fixed spatial frequency) if the system-to-chart distance is fixed. Alternatively, testing at multiple spatial frequencies may be achieved by moving a single fixed frequency chart closer or further from the imaging system if the target-to-imaging system distance is flexible (e.g., while keeping the full imaging field full of test chart features). Multiple spatial frequencies can also be implemented by changing the magnification or zoom level of the imaging system (while maintaining a single fixed frequency chart). Multiple spatial frequencies can also be implemented using a single test chart, by superimposing line pairs that have different spatial frequencies.

The inclination of the line pairs in the test chart can be selected to match with the aspect ratio of the image sensor being used to capture the test image, so that the line pairs appear to run diagonally across the test image. In the test chart 7 depicted in FIG. 1, one of the two groups of line pairs forms approximately a forty-five degree angle to the horizontal while the other group forms approximately a one hundred thirty give degree angle. Other angles of inclination are contemplated as well (e.g., horizontal and vertical lines). Multiple groups of line pairs intersecting at one point in this manner allow for testing optical sharpness in multiple directions.

Figure 7:
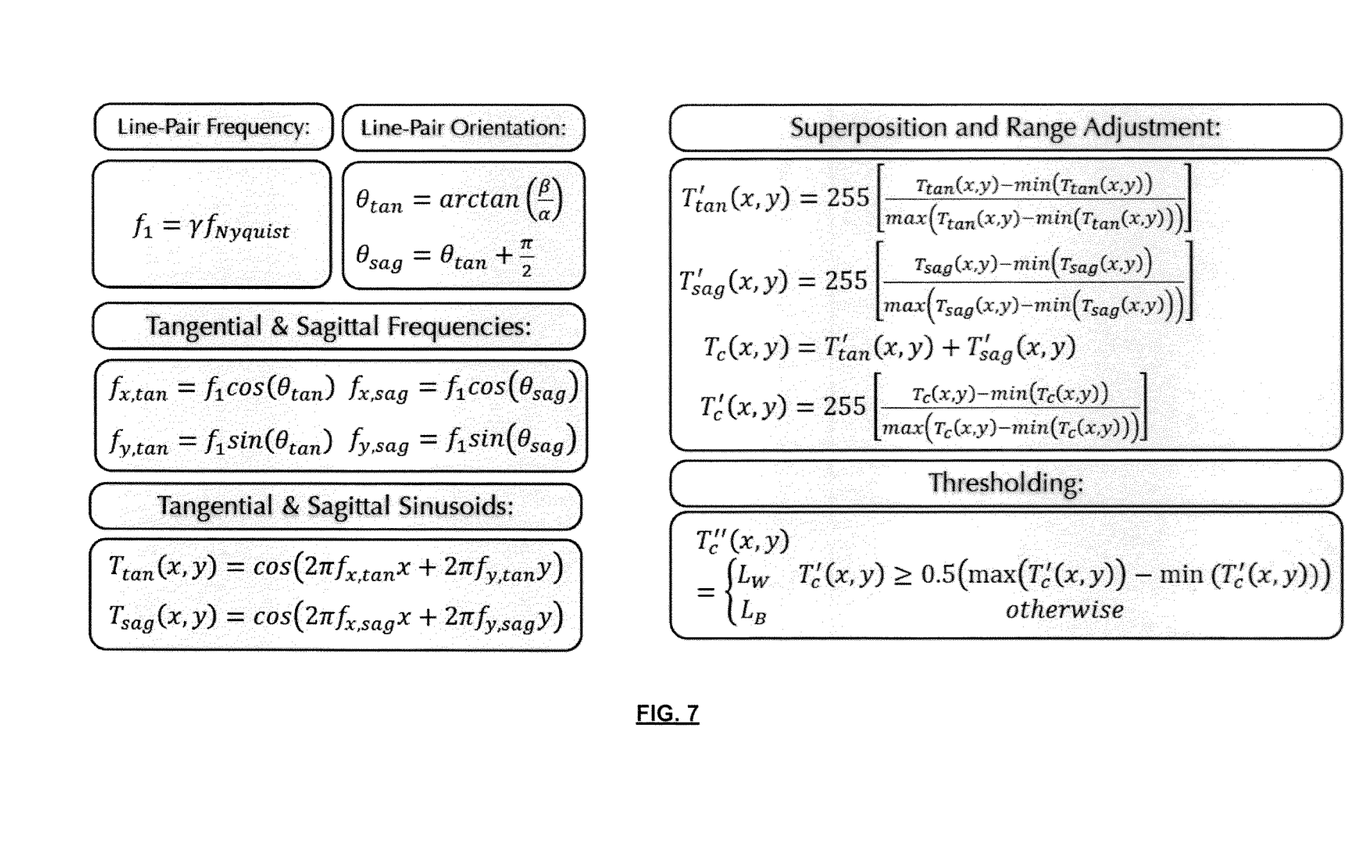
FIG. 7 is an example of formulas and algorithms used for creating a test chart in accordance with an embodiment of the invention.

An example set of formulas and algorithms for designing a test chart are listed in FIG. 7. This list includes formulas and algorithms for selecting a line pair frequency, determining line pair orientation, and other formulas that can be used to design a test chart according to an embodiment of this invention. The figures and algorithms shown in FIG. 7 are used to create a test chart that is a thresholded sum of two sinusoids with the same spatial frequency but at orthogonal directions. These formulas can be extended to add more directions. These formulas and algorithms may be embodied in a computer program (stored in a computer-readable medium) that configures a programmable processor to create the test chart by controlling a printer to produce a permanent physical chart on a substrate, or by controlling a projection device to produce a temporary test chart light image on a substrate. For example, test chart 7 may be formed as a permanent physical piece, by etching or printing the line pairs on a substrate of plastic, silicon, cardboard, cellulose or metal.

An advantage of this chart design is that the size of the chart along with the spatial frequency (e.g., spacing) of the visual element lines can be selected to test an imaging system's full image field (e.g., the sharpness across the entire spatial extent of a captured image frame or across the whole area of the system's image capability) in different directions at selected spatial frequencies. The full field sharpness may be evaluated by filling the entire digital image or frame produced by the imaging system (for instance at full sensor frame resolution) with the image of the chart. For example, all of the edges 2-5 may appear at or just beyond the periphery of the digital frame. Sharpness in different directions may be calculated by assessing the sharpness of line pairs oriented at different inclinations. Thus, using test chart 7, different aspects of image quality and analysis metrics from a given imaging system and its components may be more quickly and accurately determined by examining, testing or analyzing the entire full field of an image of the chart and testing for sharpness in different directions. For example a test process or system can use test chart 7 to yield quality analysis metrics quickly and conveniently in order to maintain a low cost for performing the measurements, and to also have a thorough test of quality analysis metrics to identify detrimental degradations which could exist in the imaging system.

In one embodiment, the test chart may be a superposition of sinusoidal gradients (rather than the bi-tonal line pairs as shown in FIG. 1). A sinusoidal gradient pattern has a gradually changing scale of colors, which repeats itself. For example, a sinusoidal gradient might have a pattern that starts with a black shade and gradually gets lighter, transitioning through tones of gray, until the shade becomes white and then gradually becomes darker to become black again. This pattern of shades repeats itself according to a specified spatial frequency. A bi-tonal chart can be created from a sinusoidal gradient pattern by selecting a darkness threshold and converting shades darker than the threshold to black and shades lighter than the threshold to white.

As compared to the test chart 7, conventional test charts might not allow precise and accurate assessment of sharpness across the entire spatial extent of a captured image. For example, some prior charts for measuring digital camera resolution and sharpness via objective metrics computed from estimates of the spatial frequency response and/or modulation transfer function have spatial features at certain fixed chart locations that are separated by gaps, and also lack fine spatial detail, especially in the gap regions, i.e. plain or solid white/gray portions of the chart. In the case of detecting local areas of sharpness non-uniformity, an image of such a prior chart captured using a camera with a sharpness non-uniformity defect co-located with the plain white portions may not reveal any problems with sharpness. Other popular prior charts used for sharpness assessment may include edge features to objectively assess Modulation Transfer Function (MTF) performance, but the density of the edges is not great enough, and thus small local areas of image quality degradation may go undetected. In addition, other prior charts for assessing MTF performance also do not provide a dense enough set of spatial details to judge sharpness across the full field of the camera system. Furthermore, other prior charts do not provide patterns that allow sharpness assessment in multiple directions at the same measurement point. Other prior charts require precise alignment of the test chart with the imaging system and are sensitive to rotation. The test chart 7 and the systems and processes for measuring sharpness disclosed in this document may better address these problems of the prior tests.

Process for Computing a Figure of Merit

Figure 3A:
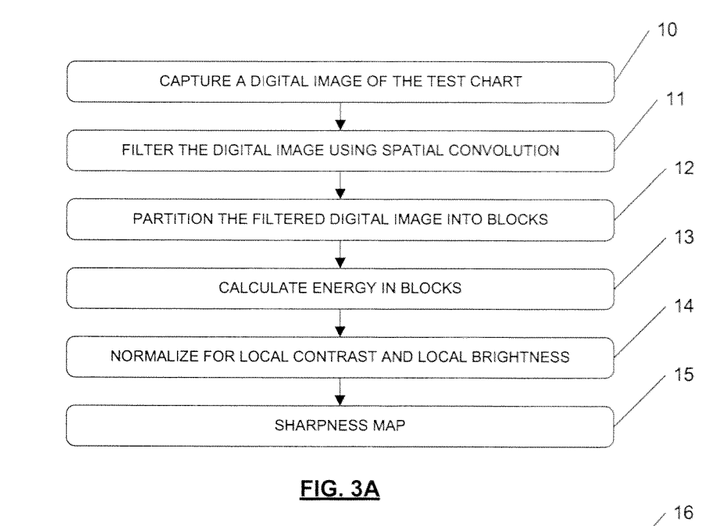
FIG. 3A-3B are flow charts showing processes for using a test chart to measure optical performance via a captured digital image, in accordance with embodiments of the invention.

FIG. 3A is a flow diagram of a process for computing optical performance metrics using the test chart 7. At block 10, an image of a test chart (e.g., the test chart 7) is captured using a device under test (DUT). The test chart is preferably captured perpendicular to the optical axis of the imager 20 and placed at a designed distance away from the DUT. The capture conditions and the test chart are such that the entire digital image is filled with the parallel line pairs pattern of the test chart 7. At block 11, a filter is applied to the entire image, using spatial convolution. The filter may consist of a kernel, that when applied to an image using spatial convolution acts as a high-pass filter or a band pass filter. The filter passes the spatial frequency of the test chart 7 and may also pass other frequencies. In one embodiment this filter is a Laplacian filter. At block 12, the filtered image is partitioned into multiple predesigned blocks (see block 6 of FIG. 1). Partitioning may include selecting a block size. The block size can be chosen as a multiple of the period of the line pairs in the image. In one embodiment, only a portion of the filtered image may be partitioned into blocks. This may be the case if there is a need for faster processing and certain areas of the image field are known to be more sensitive to sharpness degradation (e.g., such as the center of an image). In such a scenario, only those blocks can be selected that cover the areas that are prone to sharpness degradation or that are more sensitive.

At block 13, a block is selected upon which to calculate a figure of merit, such as a sharpness score. The computation process extracts, from the filtered image block, an accumulation of a measure of the block's energy that has passed or "made it" through the filter. In block 14, the block's computed energy may be normalized for local contrast and/or local brightness to make the sharpness score independent of lens shading effects in the DUT, printing differences in the test chart, and irregular illumination of the test chart.

An example of a general formula to calculate a figure of merit for a block at location (i, j), with normalization, is $$SharpnessScore(i, j) = \frac{\frac{1}{m*n}(\text{accumulation of the } score(i, j))}{(LocalContrast(i, j)*(LocalMean(i, j))^2} \quad \text{Equation 1}$$

The block size is m×n and is the same, in this example only, for all blocks. The sharpness score for a block at location (i, j) can be obtained by taking the average of the accumulation of the score, and normalizing by the square of the local contrast and the local mean.

An example of a more detailed formula to calculate the figure of merit for a block at location (i, j), with normalization, $$SharpnessScore(i, j) = \quad \text{Equation 2}$$

$$\frac{\frac{1}{m*n}\left[\sum_{x=1}^{n}\sum_{y=1}^{m}\text{Block}[(h(x,y)\otimes L_{img}(x,y))^2]_{i,j}\right]}{\left[\left(\frac{I_{white}-I_{black}}{I_{white}+I_{black}}\right)^2\right]_{i,j} * \left[\frac{1}{m*n}\sum_{x=1}^{n}\sum_{y=1}^{m}\text{Block}[L_{img}(x,y)]_{i,j}\right]^2}$$

As before, the block size is m×n and is the same in this case for all blocks. The captured image is $L_{img}(x, y)$, and the filter is h(x, y) which may be a 2-D gradient filter. The first term of the denominator of the ratio represents the local contrast. Local contrast may be calculated by checking the histogram of each block prior to filtering and calculating the local contrast according to the formula, where $I_{white}$ and $I_{black}$ are the peak values of the histogram for each block. The second term of the denominator of the ratio represents the local mean prior to filtering. Normalization of other external factors that can affect image quality is contemplated as well.

The physical meaning of the figure of merit given above can be thought of as the integrated energy of an imaging system's response to the test chart 7, weighted by the frequency response of a designed filter. The figure of merit can be a single number, which can be used to evaluate the sharpness quality of a complete imaging system. If a given block in a captured image has been degraded by some unknown degradation process (e.g., a lens defect, defocusing, contamination, etc.), the amount of energy that can make it through the filter (e.g., the numerator of the ratio in Equation 2 above) will be lower, leading to a lower sharpness score for the block. The set of sharpness scores for the partitioned blocks can be considered as a sharpness map in block 15 (tuned to the spatial frequency of the test chart as imaged using the DUT); this may be computed for all possible partitioned blocks so as to cover the entire spatial extent of the image field. This sharpness map can be used to detect image quality degradations that may have been caused by one or more optical components of the DUT. The suspected DUT may be identified or flagged as a failing unit, if any one or more of the block sharpness scores are lower than a predetermined threshold. This threshold may be selected, for example, using statistical data collected from many "passing" specimens of the DUT.

Figure 3B:
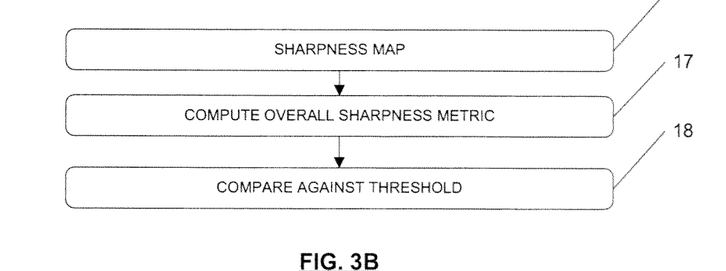

After obtaining a sharpness map in block 16 of FIG. 3B, a single sharpness score for the entire image may be calculated by accumulating the score of each block from the sharpness map (block 17). At block 18, this overall score can be compared to a threshold to identify whether the sharpness of the entire image is above or below acceptable sharpness thresholds or frequencies.

Prior test systems and processes of objectively assessing a camera system's sharpness performance use a Fast Fourier Transform (FFT) calculation to obtain a spatial frequency response, which can be very computationally intensive and hence slow, especially as the number of regions of interests (ROIs) and directions increase. For this reason, previous techniques to assess sharpness are time consuming and computationally intensive. The sharpness score calculated per the process of FIG. 3A uses spatial domain convolution instead of a FFT calculation, so that the calculation of the figure of merit is less computationally intensive and therefore faster. This is especially beneficial for testing high-volume manufactured consumer electronic devices, because testing each DUT can be time consuming if the testing process is slow and the number of DUTs is large.

The sharpness score obtained using the test chart and processes disclosed in this document can replace the spatial frequency response based tests for mass production quality testing of optical systems. Thus, the full field chart and sharpness measure disclosed in this document may overcome the limitations of the existing methods by providing a chart with a high density of spatial frequency details tuned to the imaging system under test along with an objective measure which accurately and quickly assesses the system's full field sharpness performance in different directions at the specific spatial frequency of the chart features.

For example, sharpness scores of blocks in the full field of the imaging system can be determined by a test system or process to identify whether the imaging system, and possibly which of its optical components, are below design or fabrication specification. Such a component may include an optical lens assembly, or an entire camera module including some front end image signal processing.

Several supplemental image quality measures can be extracted from the test chart other than full field sharpness. In one embodiment, the construction of the test chart as a superposition of parallel line pairs may create a uniform grid of white and black, generally circular features. Using simple binary image processing, these features can be located to sub-pixel precision. Using this grid of extracted features, several supplemental image quality measures can be extracted such as diagonal field of view, rotation, tilt, geometric distortion, and chromatic aberration.

Figure 4:
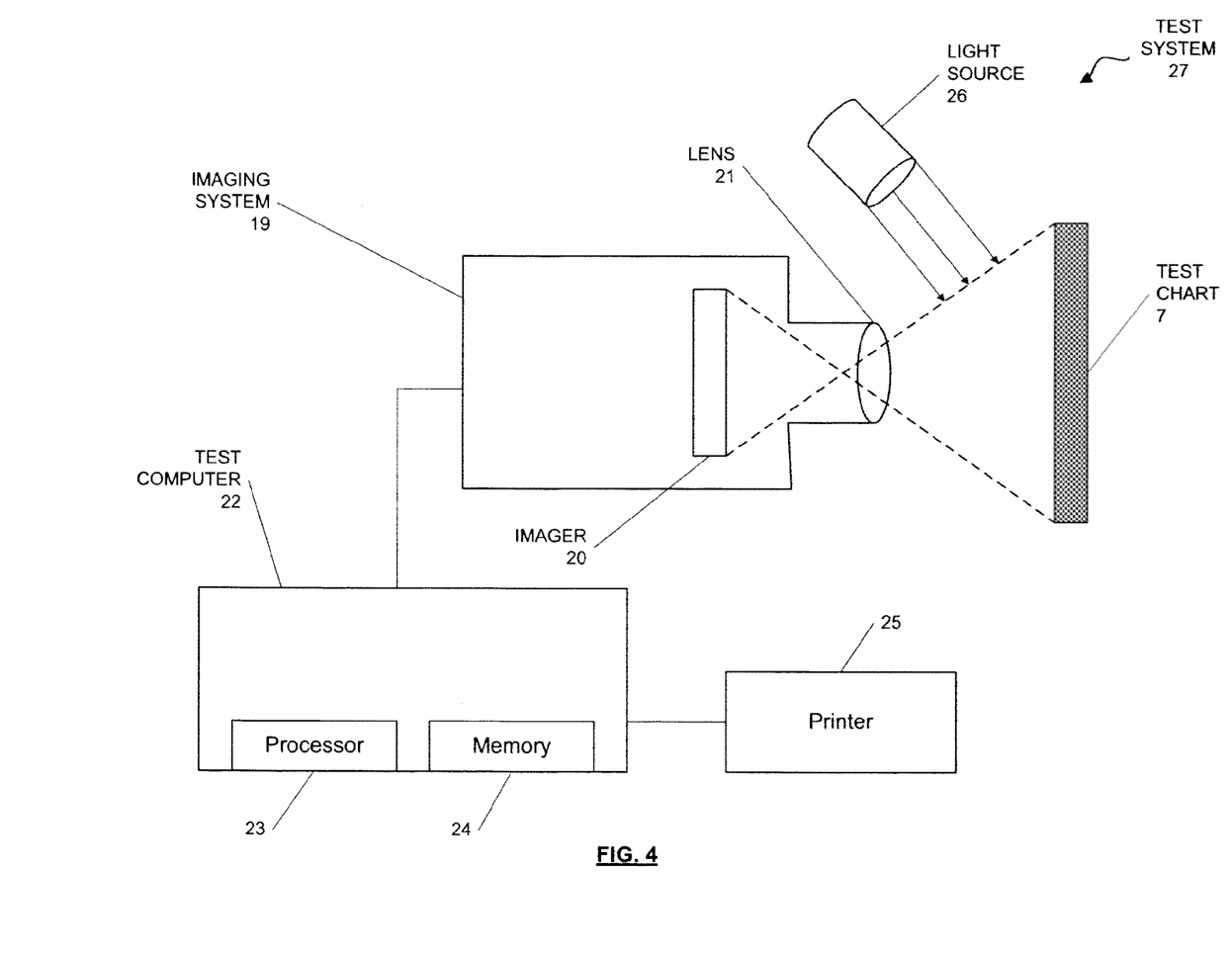
FIG. 4 is a representation of a test system that can be used for the measurement of optical performance in accordance with embodiments of the invention.
Figure 5:
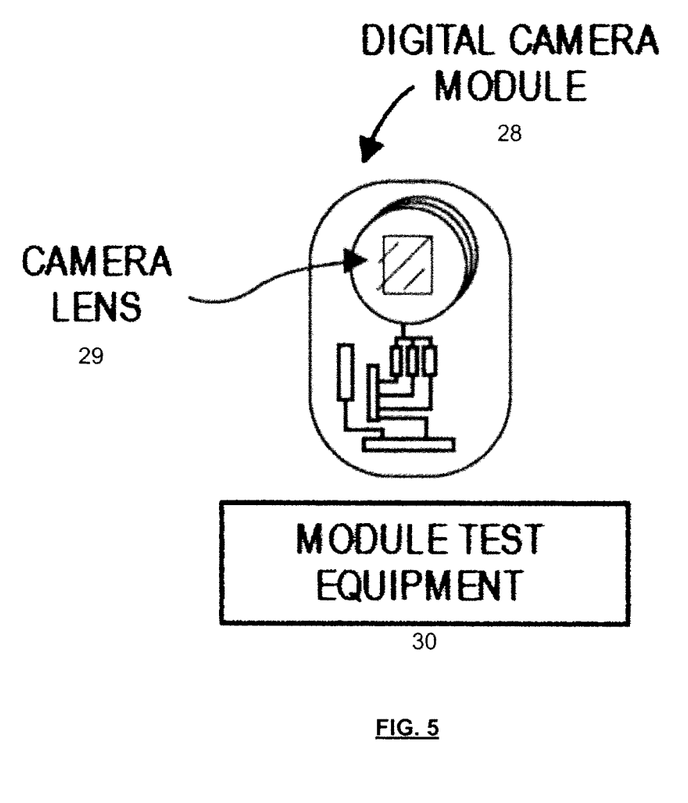
FIG. 5 depicts a camera module as the device under test (DUT), installed in a test system.

Test System:

FIG. 4 is a representation of a test system 27 that can be used for the monitoring and measurement of image quality of an image captured by a digital camera, in accordance with embodiments of the invention. Test system 27 may be part of a high volume manufacturing production test line for an optical component, which may be referred to as a device under test (DUT). The DUT may include just the lens 21, or it may include an entire imaging system 19 (e.g., a digital camera module). FIG. 5 depicts an example of a digital camera module 28 imaging system that can be tested using the test system.

The test system positions the imaging system 19 at a selected distance from the test chart 7, which is lit by a light source 26. The light source 26 may provide uniform light intensity and color across the entire area of the surface of the test chart 7. Imaging system 19 is operatively connected to test computer 22, using a data cable or wireless technology, so that a test computer 22 can receive the digital image data of the image taken by the imaging system 19 of the test chart 7.

The test computer 22 has a processor 23 and memory 24 that can store and run a test program (e.g., a computer program product) to perform the processes described above in FIGS. 3A-3B including measuring the full field optical performance of a DUT, by digitally processing the image captured by the imaging system 19. The test computer 22 may be connected to a printer 25 or to a display screen (not shown) to show the results of the testing. The printer 25 could also be used to produce the test chart 7 as described above in accordance with the algorithm depicted in FIG. 7.

In some embodiments, the "full field" may be described by an image of a test chart (e.g., test chart 7) having line pairs formed across the whole area of the chart, where the image covers (e.g., fills, occupies, or takes up): (1) the maximum field of view or frame size of the imaging system; (2) the entire image field or area of an image that is captured by the imager; (3) the entire area of image sensor 8 that is processed by or that exists in an image produced by the imaging system; or (4) the entire spatial extent of the captured image frame in the x and y directions. For example, each of edges 2-5 of the chart (e.g., see FIG. 1) may be formed as an optical image, either at or beyond the outside edge of the image sensing array of the sensor 8 of the camera.

Using test chart 7 and the figure of merit computation processes described above may result in more accurate, efficient and reliable testing data for the DUT. An image of test chart 7 should fill an entire image field or area of the image that is captured by the imager 20. The image data may then be sent to the test computer 22 for analysis (in accordance with the process above in FIGS. 3A-3B.

Figure 6:
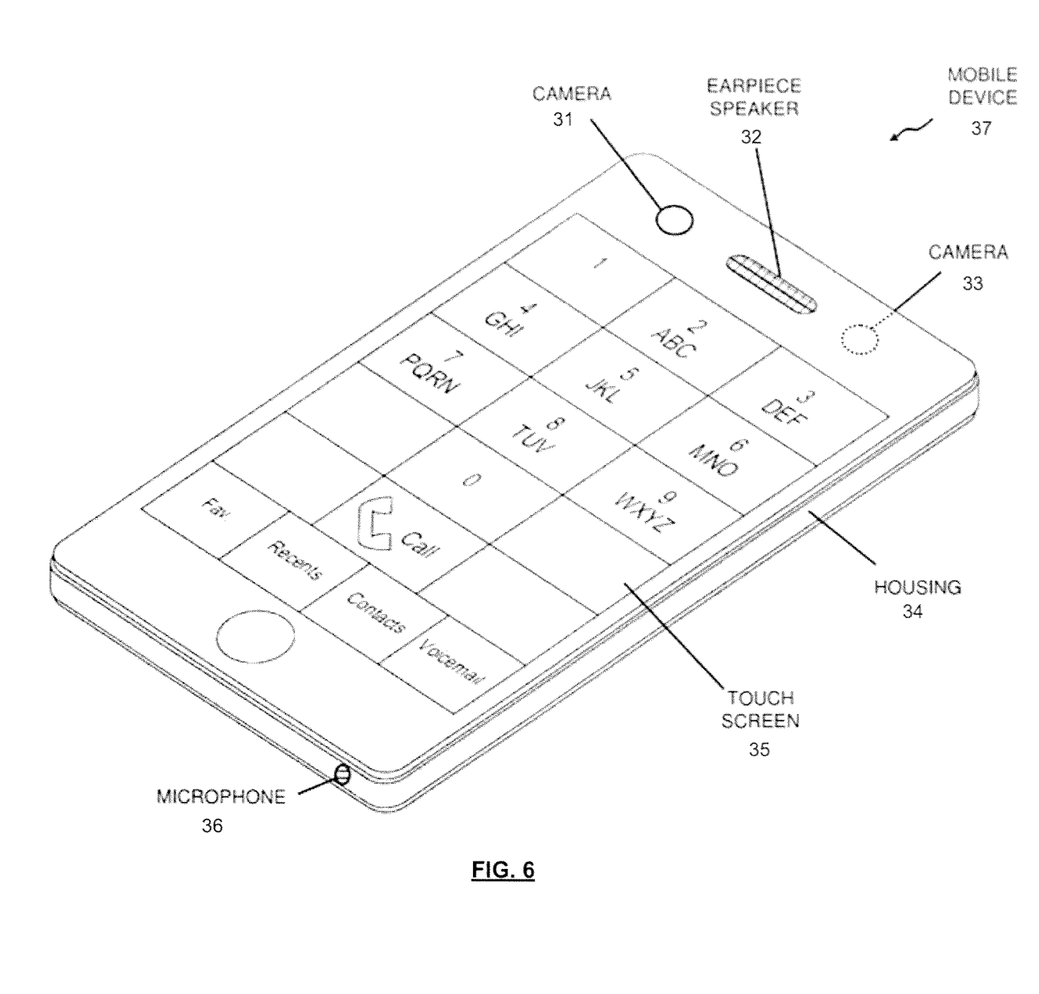
FIG. 6 depicts an example consumer electronic device with which a DUT can be integrated.

In some situations a test system or process can be used in a research laboratory or during manufactured device quality inspection to ensure a camera, camera module, or imaging system of a device has an acceptable sharpness throughout and within its entire imagable full field. The test system or process may be particularly applicable for small form factor type cameras, such as those that are installed in a portable or mobile devices including a cellular telephone (such as an iPhone™ device by Apple Inc., of Cupertino Calif.), a laptop computer, a PDA, a tablet computer (such as an iPad™ device), or a standalone professional digital camera. For example, low form factor or low profile portable devices may have an optical component or imaging system that can be tested using the methods, target, and systems described herein. FIG. 6 shows an example mobile device 37 in which an optical component or imaging system DUT can be integrated. The optical component or imaging system may be tested while in the mobile device or separately, such as prior to installation into the device.

Furthermore, it should also be noted that in some cases, the test processes described herein may run on a device such as a mobile device 37. In this case the test may be used to test, calibrate and/or repair an imaging system or component that is already installed in the device. In other cases, the mobile device 37 or imaging system 19 may be used only for capturing the image, after which the processes of the present embodiments is performed or run on another "test system" device such as including a test computer (e.g., see FIG. 4).

It also is considered that the processes and systems mentioned herein may be embodied in a computer-readable medium storing data and instructions to cause a programmable processor to perform operations described. The medium may be tangible and/or non-volatile. Some examples of computer-readable storage mediums are flash drives, USB drives, DVDs, CD-ROM disks, ROM cards, floppy disks, magnetic tapes, computer hard drives, and server storage on a network. For instance, an embodiment of the invention can be implemented as computer software in the form of computer readable code (e.g., read from a non-volatile or tangible medium and) executed by test computer 22 illustrated in FIG. 4 to test an imaging system and/or print out a test chart.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A test system for testing digital camera devices, comprising:
    a test chart for evaluating optical characteristics of a camera device under test (DUT), the chart comprising a surface that is to face the DUT and in which there is a superposition of two or more groups of parallel line pairs, wherein all of the groups of parallel line pairs are oriented at different inclinations;
    a light source to provide uniform visible light intensity and color incident upon the surface of the test chart; and
    a test computer to execute a test program for measuring full field optical performance of the DUT by digitally processing an image of the surface of the test chart as captured by the DUT when the surface of the test chart is lit by the light source.

2. The test system of claim 1 wherein the groups of parallel line pairs have the same spatial frequency.

3. The test system of claim 1 wherein the line pairs within a group of parallel line pairs have different spatial frequencies.

4. The test system of claim 1 wherein all of the line pairs extend uninterrupted from one edge to another edge of the field of view of an imaging system, containing the DUT, that captures an image of the test chart.

5. The test system of claim 1, wherein the superposition consists of two groups of parallel slanted line pairs with the same spatial frequency, the first group being inclined relative to the line pairs in the second group.

6. The test system of claim 5, wherein the first group of parallel slanted line pairs is perpendicular relative to the second group of parallel line pairs.

7. The test system of claim 1 wherein the line pair frequency is a fraction of the Nyquist frequency of the DUT.

8. A method for evaluating optical characteristics of a device under test (DUT), comprising:
    applying spatial convolution to a filter and a digital image of a test chart captured by an imaging system using the DUT, wherein the test chart comprises a superposition of two or more groups of parallel line pairs oriented at different inclinations and all of the line pairs extend from one edge of the field of view of the imaging system to another edge as seen in a full sensor resolution image from the system;
    selecting a block size and partitioning essentially the entire spatial extent of the filtered digital image into a plurality of blocks based on the block size;
    calculating a measure of the energy in each of a selected group of the blocks of the filtered digital image; and
    using the measure of energy in each of the selected blocks to compute a figure of merit relating to an optical characteristic of the DUT.

9. The method of claim 8 wherein the figure of merit is a sharpness score.

10. The method of claim 8 further comprising comparing the figure of merit to a threshold and using a result of the comparison to inform a decision as to whether or not the DUT passes an optical performance test.

11. The method of claim 8 wherein said using the measure of energy in each of the selected blocks to compute a sharpness score comprises normalizing the energy measure.

12. The method of claim 8, further comprising generating a sharpness map for the entire field based on the sharpness score of each of the blocks.

13. The method of claim 8 wherein the superposition consists of two groups of parallel line pairs, the line pairs in the first group being inclined relative to the line pairs in the second group.

14. The method of claim 8, wherein the block size is a multiple of the period of the lines in the digital image.

15. The method of claim 8, wherein the filter is a Laplacian Filter.

16. The method of claim 11, wherein normalization comprises normalizing for local contrast and local brightness.

17. The test system of claim 1 wherein the DUT is a digital camera module used in consumer electronic devices.

18. The test system of claim 1 wherein the DUT is designed so that under the proper focus, zoom and distance to target conditions, the groups of parallel line pairs fill a full image field of view of the DUT.

19. The test system of claim 1 wherein the DUT is positioned at a selected distance from the test chart which is to be lit by the light source.

20. The test system of claim 1 wherein all of the line pairs extend uninterrupted from one edge to another edge of a field of view of an imaging system, containing the DUT, that captures an image of the test chart, and wherein the superposition consists of a first and a second group of parallel slanted line pairs with a same spatial line pair frequency, the line pairs of the first group being inclined relative to line pairs in the second group.

* * * * *